(12) United States Patent
Santavicca

(10) Patent No.: US 9,241,235 B2
(45) Date of Patent: Jan. 19, 2016

(54) PASSIVE ENTRY CELL PHONE AND METHOD AND SYSTEM THEREFOR

(71) Applicant: Voxx International Corporation, Hauppauge, NY (US)

(72) Inventor: Joseph Santavicca, Macomb, MI (US)

(73) Assignee: VOXX INTERNATIONAL CORPORATION, Hauppauge, NY (US)

( * ) Notice: Subject to any disclaimer, the term of this patent is extended or adjusted under 35 U.S.C. 154(b) by 10 days.

(21) Appl. No.: 13/829,852

(22) Filed: Mar. 14, 2013

(65) Prior Publication Data

US 2014/0274013 A1    Sep. 18, 2014

(51) Int. Cl.
   *H04M 1/60*     (2006.01)
   *H04W 84/18*    (2009.01)
   *H04W 4/00*     (2009.01)
   *H04M 1/725*    (2006.01)

(52) U.S. Cl.
   CPC ............ *H04W 4/008* (2013.01); *H04M 1/7253* (2013.01); *H04M 2250/02* (2013.01)

(58) Field of Classification Search
   USPC ............... 701/2; 340/241, 5.72, 5.6, 5.22; 307/101, 328; 455/418, 41.2, 420, 411, 455/557, 409, 552.1, 404.1, 404.2, 425, 455/553.1, 569.2
   See application file for complete search history.

(56) References Cited

U.S. PATENT DOCUMENTS

| 7,245,997 | B2 * | 7/2007 | Kitao et al. ................... 701/29.1 |
| 7,542,827 | B2 * | 6/2009 | Gerard et al. ..................... 701/2 |
| 7,778,186 | B2 * | 8/2010 | Oman et al. .................. 340/5.61 |
| 7,904,219 | B1 * | 3/2011 | Lowrey et al. ............... 701/32.3 |
| 2004/0201277 | A1 * | 10/2004 | Hentsch et al. ............... 307/10.1 |
| 2005/0258936 | A1 * | 11/2005 | Ghabra et al. ............... 340/5.72 |
| 2006/0114100 | A1 * | 6/2006 | Ghabra et al. ............... 340/5.61 |
| 2006/0208854 | A1 * | 9/2006 | Baumgartner et al. ...... 340/5.61 |
| 2008/0246586 | A1 * | 10/2008 | Hiramine ..................... 340/5.72 |
| 2010/0048244 | A1 | 2/2010 | Goren |
| 2010/0305779 | A1 | 12/2010 | Hassan et al. |
| 2011/0060480 | A1 * | 3/2011 | Mottla et al. ...................... 701/2 |
| 2012/0039248 | A1 | 2/2012 | Schneider et al. |
| 2012/0092129 | A1 * | 4/2012 | Lickfelt ........................ 340/5.72 |
| 2012/0129493 | A1 * | 5/2012 | Vasudevan ................... 455/411 |
| 2012/0221173 | A1 * | 8/2012 | Ampunan et al. ................. 701/2 |
| 2013/0237174 | A1 | 9/2013 | Gusikhin et al. |
| 2013/0237189 | A1 * | 9/2013 | Nishidai ...................... 455/411 |

OTHER PUBLICATIONS

International Search Report dated Aug. 1, 2014 for corresponding International Appln. No. PCT/US14/27249.

* cited by examiner

*Primary Examiner* — Christopher M Brandt
(74) *Attorney, Agent, or Firm* — F. Chau & Associates, LLC

(57) ABSTRACT

A system for a vehicle including: a bluetooth receiver configured to be installed in a vehicle and connected with an electronic system of the vehicle; and a phone including a long-range radio frequency (RF) transceiver configured to transmit signals to and receive signals from a cellular network and a bluetooth transmitter configured to communicate with the bluetooth receiver in the vehicle within a predetermined range.

14 Claims, 4 Drawing Sheets

PASSIVE ENTRY CELL PHONE AND METHOD AND SYSTEM THEREFOR

BACKGROUND OF THE INVENTION

1. Technical Field

The present invention relates to smart phone control of vehicle functions.

2. Discussion of the Related Art

An electronic key fob is generally used to lock/unlock/start an automobile. Smart phone applications have been developed to give smart phones the functionality of a key fob. For example, a smart phone with the appropriate software application can be used in place of an electronic key fob to lock and unlock doors, control a car find feature (audible horn honk), start a vehicle remotely, or program auxiliary outputs (like trunk release). However, the wireless communication between the phone and the car generally occurs over a cellular network, thereby introducing latency between command and response time.

SUMMARY OF THE INVENTION

According to an exemplary embodiment of the present invention, a system for a vehicle may include: a BLUETOOTH® receiver configured to be installed in a vehicle and connected with an electronic system of the vehicle; and a phone including a long-range radio frequency (RF) transceiver configured to transmit signals to and receive signals from a cellular network and a BLUETOOTH® transmitter configured to communicate with the BLUETOOTH® receiver in the vehicle within a predetermined range.

The electronic system of the vehicle may provide remote keyless entry, passive entry, or push button start functions.

The push button start system may be configured to recognize the phone as a key fob that is used to activate the push button start system.

The phone may include a memory configured to store a software application enabling the phone to be recognized as the key fob.

A door of the vehicle may be unlocked by using the BLUETOOTH® receiver and transmitter when the phone is within the predetermined range.

The phone may further comprise a display configured to illustrate key fob related functions.

The display may further be configured to illustrate diagnostic information of the vehicle.

According to an exemplary embodiment of the present invention, a mobile device may include: a memory configured to store a software application enabling the mobile device to be recognized as a key fob for a specific vehicle; a long-range RF transceiver configured to transmit signals to and receive signals from a cellular network; and a short-range RF transmitter configured to communicate with a short range RF receiver in the vehicle within a predetermined range, wherein a push button start system of the vehicle is configured to recognize the mobile device as the key fob such that the vehicle is able to be started when the mobile device is in the vehicle and the key fob is out of range of the vehicle.

A door of the vehicle may be unlocked by using the short-range RF transmitter and receiver when the mobile device is within the predetermined range.

The mobile device may further include a display configured to illustrate functions related to the key fob.

The display may be configured to illustrate preferences of the vehicle.

According to an exemplary embodiment of the present invention, a method for providing vehicle access may include: receiving a request for vehicle access; providing vehicle access credentials to a mobile device associated with the request for access; accessing a vehicle by using the mobile device; and starting the vehicle by using the mobile device in place of the key.

The method may further include downloading, at the mobile device, a software application that allows the vehicle access credentials to be provided to the mobile device.

The mobile device may access the vehicle by using a BLUETOOTH® connection.

The mobile device may start the vehicle by using the BLUETOOTH® connection.

The vehicle access credentials may permit access to the vehicle for a predetermined time.

The method may further include providing, to the mobile device, a location of the vehicle associated with the vehicle access credentials.

The mobile device may be a smart phone.

The mobile device may be a BLUETOOTH® badge.

DETAILED DESCRIPTION OF EXEMPLARY EMBODIMENTS

Figure 1:
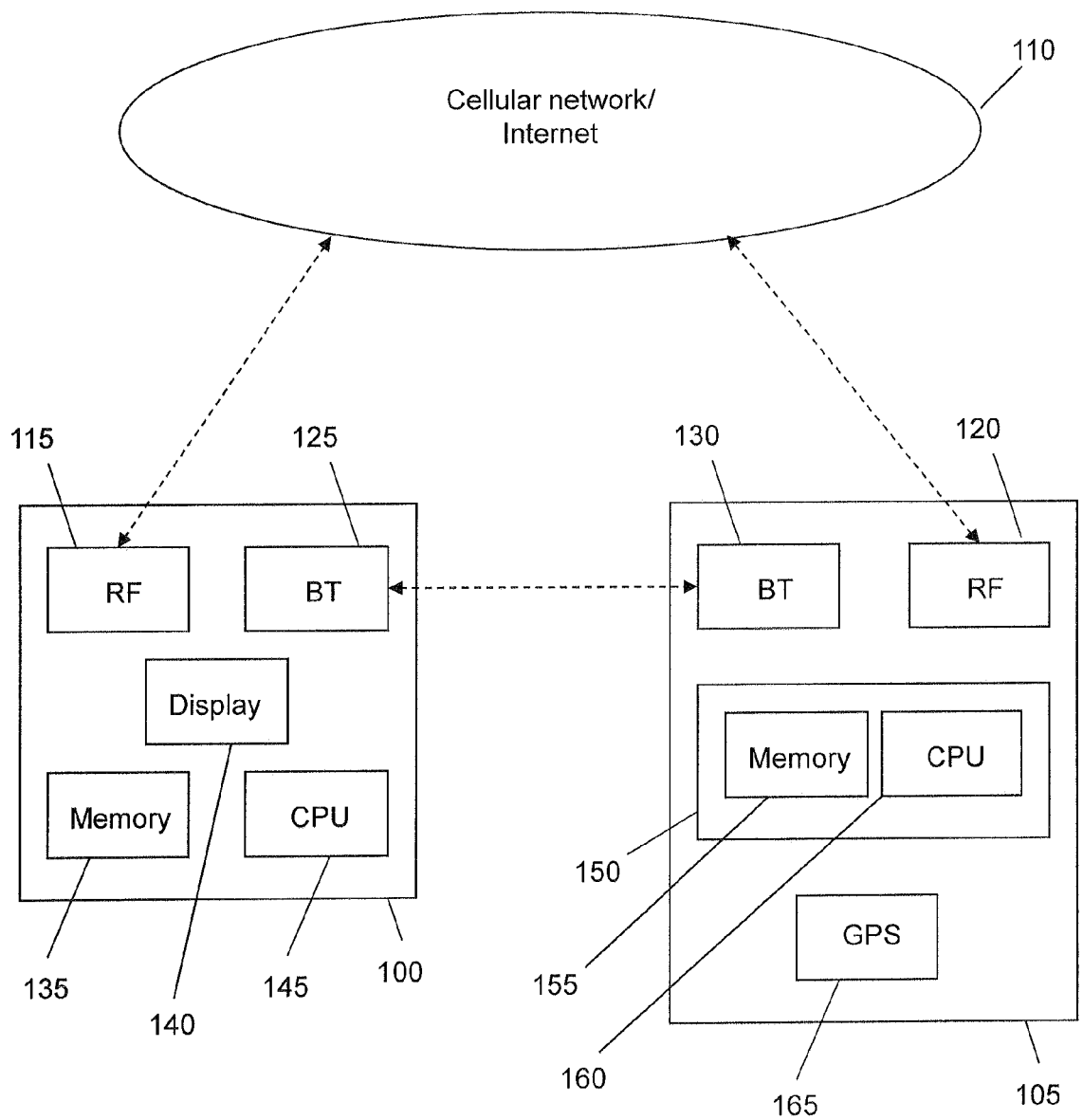
FIG. 1 is a block diagram of a system according to an exemplary embodiment of the present invention.

FIG. 1 is a block diagram of a system according to an exemplary embodiment of the present invention. The system may include a mobile device 100 and a vehicle 105. The mobile device 100 may be a smart phone, for example. The vehicle 105 may be a passenger car, for example. The mobile device 100 may be used to make phone calls via a cellular network 110. The mobile device 100 may access the internet via the network 110. The vehicle 105 may also be communicably coupled to the network 110.

The mobile device 100 may include, but is not limited to, a long-range radio frequency (RF) transceiver 115, a short-range BLUETOOTH® transceiver 125 (or a BLUETOOTH® 4.0 transmitter, for example), a memory 135, a central processing unit (CPU) 145 and a display 140.

In the case that the mobile device 100 is a smart phone, the smart phone is a mobile phone built on a mobile operating system. The display 140 may be a touchscreen and have a web browser that displays standard web pages as well as mobile-optimized sites. High-speed data access may be provided by Wi-Fi and mobile broadband. The smart phone can make and receive telephone calls by connecting to the cellular network 110 with the RF transceiver 115. Web pages may be displayed on the display 140 under control of the CPU 145 and memory 135.

Other than a smart phone, the mobile device 100 may be a handheld computing device having a display screen with touch input and/or a miniature keyboard. The mobile device 100 may also be a laptop computer or a BLUETOOTH® badge.

The vehicle 105 may include an RF transceiver 120 for communicating with the network 110 and a BLUETOOTH® transceiver 130 for communicating with the mobile device 100 via the BLUETOOTH® transceiver 125 of the mobile device 100. The BLUETOOTH® transceiver 130 may be a BLUETOOTH® receiver (with or without transmit ability) that can plug into a telematics/DBI port in the vehicle 105. The vehicle 105 may include a global positioning system (UPS) module 165 that can be used to provide location information of the vehicle 105. The vehicle 105 may further include a control unit 150, itself including a memory 155 and CPU 160. The control unit 150 may be an embedded system that controls one or more of the electrical system or subsystems in the vehicle 105. The control unit 150 may be a vehicle security pre-load module. As an example, the control unit 150 may be part of a remote keyless entry system, passive entry or push-button start system. The BLUETOOTH® 4.0 receiver, or alternatively a near field communication (NFC) receiver, may be embedded in the control unit 150.

A remote keyless entry system may refer to a lock that uses an electronic remote control as a key which is activated by a handheld device or automatically by proximity.

A passive entry system or push button start system may include a smart key that allows a driver to keep the key fob in their pocket when unlocking, locking and starting a vehicle. The key may be identified via one of several antenna's in the car's bodywork and a radio pulse generator in the key housing. For example, once the vehicle's system recognizes the presence of the fob, all the driver needs to do to get the motor running is to depress the brake pedal and push a button on the control panel. Further, each key contains a key contains a chip with an ID code that the car must recognize. In addition, there is a random code that each key receives when the engine is shut off. The vehicle will read and match both codes. If the car cannot match the ID code to the last random code sent to the key in question, it will not start.

Figure 2:
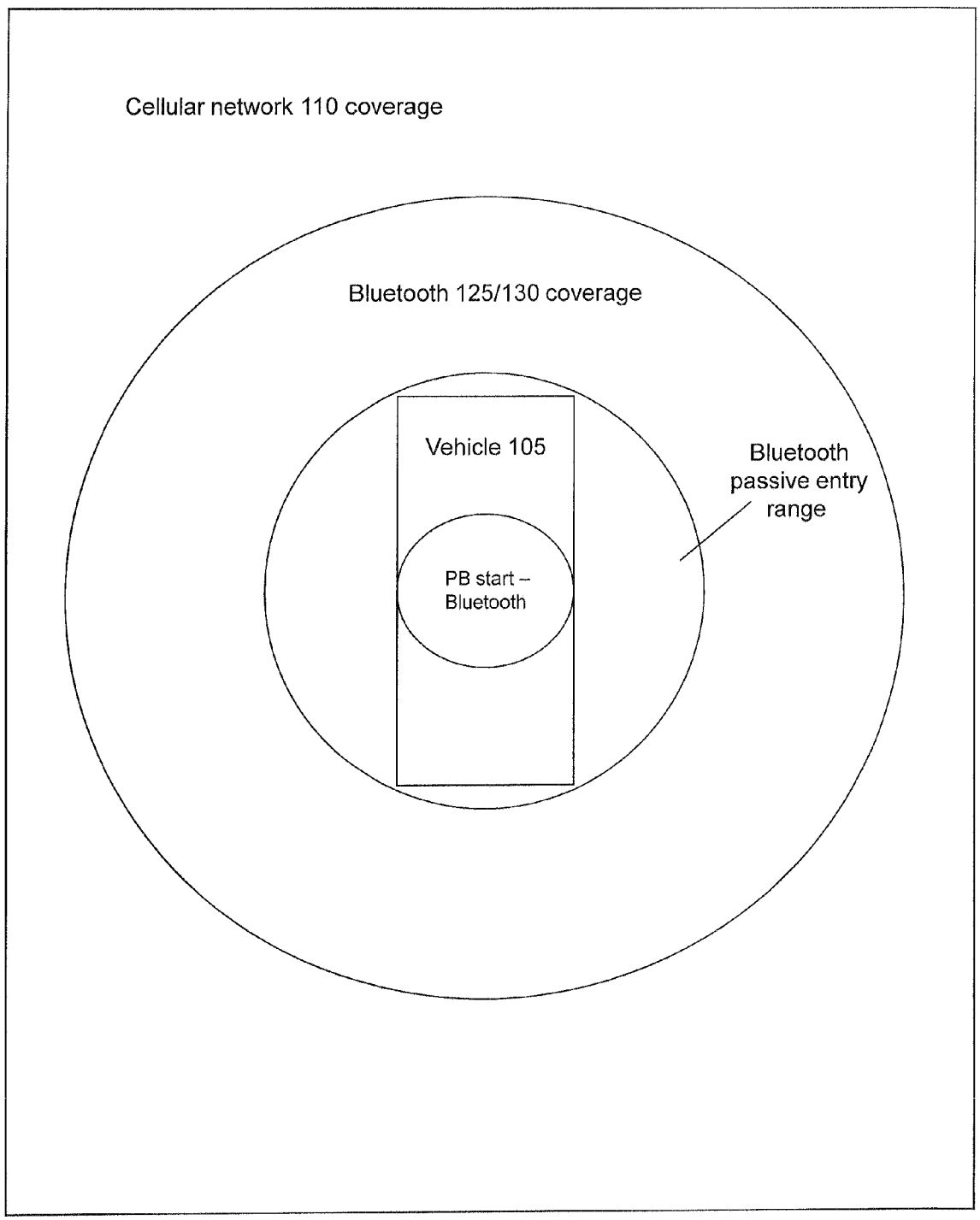
FIG. 2 is a coverage diagram of a system according to an exemplary embodiment of the present invention.

Referring FIG. 2, with respect to the vehicle 105, the cellular network 110 has a coverage that is essentially unlimited in range for remote keyless entry, remote start and vehicle data functionality. The coverage of the BLUETOOTH® components 125/130, with respect to the vehicle 105, is about 100 feet for remote keyless entry, remote start and vehicle data functionality. As it pertains to BLUETOOTH® passive entry, the range for this functionality may be calibrated to directly surround the vehicle 105 within a few feet. Received signal strength indication (RSSI) may be used for passive entry. The push-button start may also be accomplished via BLUETOOTH®; however is further utilized to determine the presence of the mobile device 100 in the vehicle 105.

Referring now to FIGS. 1 and 2, in accordance with an exemplary embodiment of the present invention, NFC or BLUETOOTH® RSSI can be used to ensure the mobile device 100 is in the vehicle 105 and a high-grade encryption/authentication process can be used to enable the mobile device 100 to act in the stead of a passive entry passive start (PEPS or push-button) system. In this case, the user could load a software application onto the mobile device 100 via the interact 110, launch the application, create an account and add the vehicle 105 to their account, for example. Once this is done the PEPS keyfob would not be needed since all immobilizer bypass functions could be accomplished by the mobile device 100. For example, the vehicle 105 may be started just due to the presence of mobile device 100.

It is to be understood that the vehicle 105 may include a compatible system equipped with a telematics port. Such an in-vehicle system may be a Prestige, Code Alarm or Pursuit brand remote start system, for example. The compatible system can be part of the control unit 150 or communicably coupled to the control unit 150. Further, the encryption/authentication process can occur each time the mobile device 100 enters the BLUETOOTH® range of the vehicle 105. The encryption/authentication process may be similar to that described above for the factory key fob.

In accordance with an exemplary embodiment of the present invention, still referring to FIGS. 1 and 2, BLUETOOTH® 4.0, which has a higher range than previous versions, can be used as a remote keyless entry reception method. In this case, the BLUETOOTH® transceiver 130 (or simply a BLUETOOTH® receiver) is installed in the vehicle 105. The receiver can be within a remote start in vehicle unit or a cell phone/OBD II module that is keyed to the above-mentioned application, for example. The mobile device 100 can then be used as a medium range remote keyless entry transmitter. For example, as the mobile device 100 enters the BLUETOOTH® range of the vehicle 105, the application can wake up and commands such as door unlock can be transmitted to the vehicle 105 via the BLUETOOTH® protocol. Consequently, there is no need to send these commands through the cellular network 110, thus the latency associated with cellular communication is reduced.

When the mobile device 100 has the above-mentioned application installed, the display 140 may show a variety of icons related to key fob functionality. For example, an individual icon may be shown for each of lock, unlock, find and start functions and may be responsive to user touch. The application may further enable a user to get vehicle diagnostic information or set preferences by way of the display 140.

Figure 3:
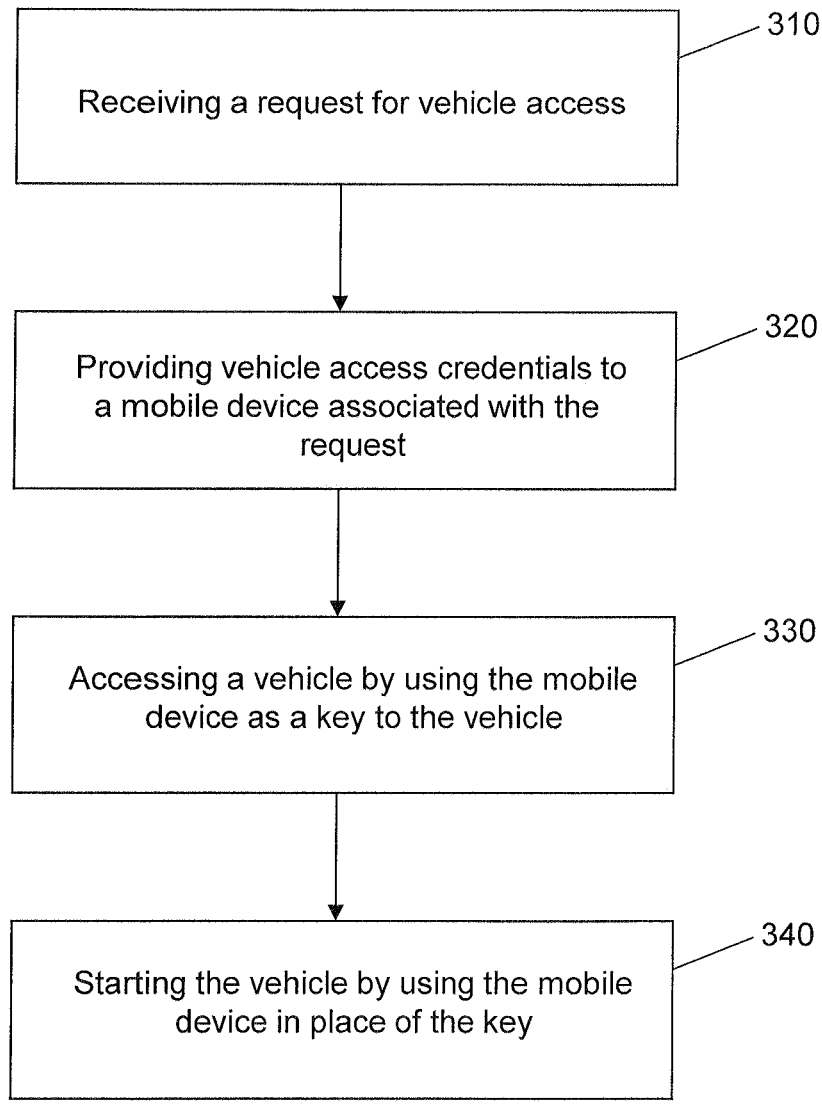
FIG. 3 is a flowchart of a method according to an exemplary embodiment of the present invention.

FIG. 3 is a flowchart of a method according to an exemplary embodiment of the present invention. As shown in FIG. 3, a request for vehicle access is received (310). This request may come from a user of the mobile device 100, in-person by the user or via the internet or phone by the user, for example. The request may be received by a person or by an online reservation suite, for example. The request may be a request to rent a vehicle. The vehicle type may be specified in the request. The length of the rental period may also be specified in the request.

In response to the request, vehicle access credentials may be provided to the user (320). For example, the vehicle access credentials may be provided directly to the user's mobile device 100. For the vehicle access credentials to be provided to the mobile device 100, an application must be downloaded to the mobile device 100. This application may be similar to the one described above such that the mobile device 100 can be used to operate a specific vehicle when its has downloaded the access credentials for that vehicle. The vehicle access codes, which may be encrypted and use a similar authentication process to that described above for the factory key, may only be good for a predetermined time period. The vehicle access codes can give complete, feature limited or valet access to the vehicle 105 including starting/driving the vehicle 105 during the access period. In this case, no physical key is needed. All access functions could be performed by the mobile device 100 as described above (330/340).

In an exemplary embodiment of the present invention, a smart phone user with the aforementioned application could provide access credentials of their car to another smart phone user for a certain time period. Payment for this access could be accepted electronically via a PayPal, for example. The identifying features and location of the car could also be sent to the renting user. This way, the renting user can locate the vehicle, which may be parked on a residential or city street, rather than large rental lot, and access the car with the codes once in BLUETOOTH® range, for example. If the renter does not have a BLUETOOTH® equipped phone or the car is not BLUETOOTH® equipped, the access may be via a cell phone network. When the user is done with the car they may park it in a pre-designated area. The car's owner may be able to locate it by using a OPS module in the car.

In an exemplary embodiment of the present invention, BLUETOOTH® badges (e.g., proximity dongles) that have the above-mentioned passive entry/passive start enable capability could be sold. These badges could be programmed to have a predetermined usage time period for a specific car. The badge could be used in place of a key and once its preprogrammed time period expires, the badge could be discarded.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article or manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
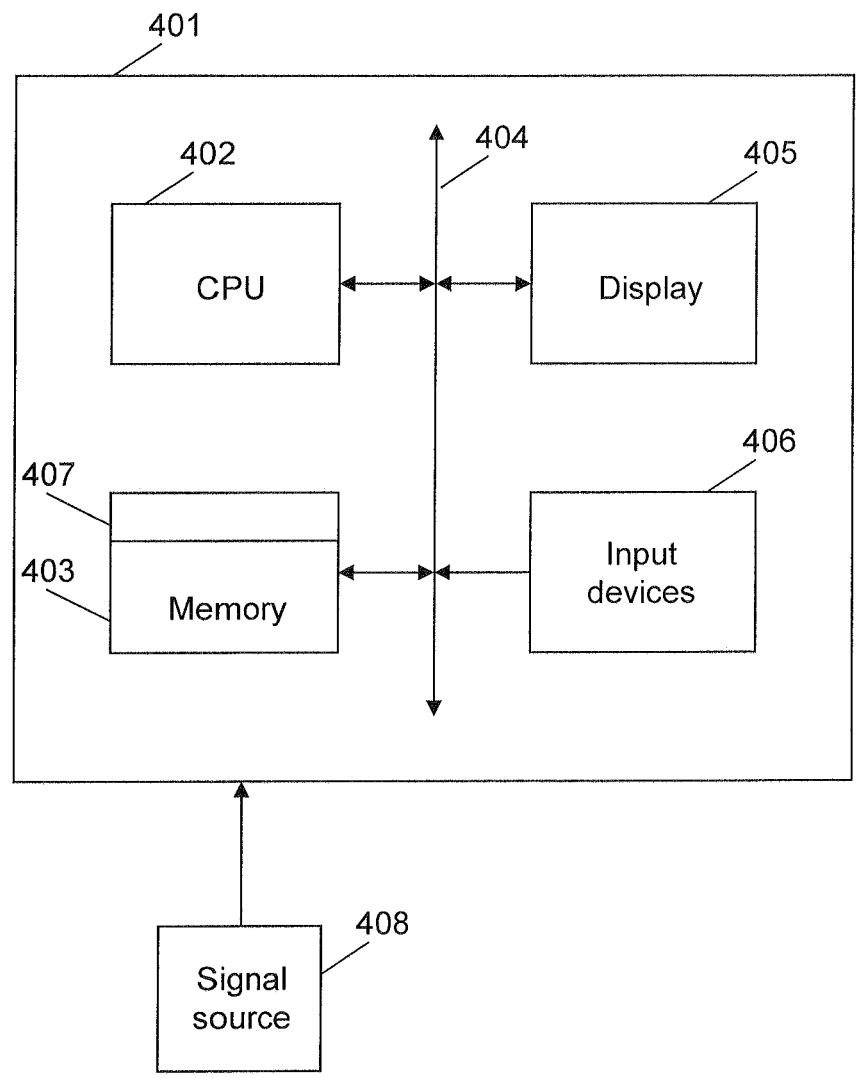
FIG. 4 illustrates a computer system in which an exemplary embodiment of the present invention may be implemented.

Referring now to FIG. 4, according to an exemplary embodiment of the present invention, a computer system 401 can comprise, inter alia, a central processing unit (CPU) 402, a memory 403 and an input/output (I/O) interface 404. The computer system 401 is generally coupled through the I/O interface 404 to a display 405 and various input devices 406 such as a mouse and keyboard. The support circuits can include circuits such as cache, power supplies, clock circuits, and a communications bus. The memory 403 can include RAM, ROM, disk drive, tape drive, etc., or a combination thereof. Exemplary embodiments of present invention may be implemented as a routine 407 stored in memory 403 (e.g., a non-transitory computer-readable storage medium) and executed by the CPU 402 to process the signal from a signal source 408. As such, the computer system 401 is a general-purpose computer system that becomes a specific purpose computer system when executing the routine 407 of the present invention.

The computer system 401 also includes an operating system and micro-instruction code. The various processes and functions described herein may either be part of the micro-instruction code or part of the application program (or a combination thereof) which is executed via the operating system. In addition, various other peripheral devices may be connected to the computer system 401 such as an additional data storage device and a printing device. Aspects of the computer system 401 are applicable to the mobile device 100 and control unit 105 of FIG. 1.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to best explain the principles of the invention and the practical application, and to enable others of ordinary skill in the art to understand the invention for various embodiments with various modifications as are suited to the particular use contemplated.

What is claimed is:

1. A system for a vehicle, comprising:
    a BLUETOOTH® receiver configured to be plugged into a telematics port of a vehicle and connected with an electronic system of the vehicle, wherein the electronic system of the vehicle includes a BLUETOOTH® passive entry system; and
    a phone including a long-range radio frequency (RF) transceiver configured to transmit signals to and receive signals from the electronic system of the vehicle through a cellular network and a BLUETOOTH® transmitter configured to communicate with the BLUETOOTH® receiver in the vehicle within a predetermined range,
    wherein the predetermined range is a distance for dock lock and unlock in the BLUETOOTH® passive entry system and the predetermined range is calibrated using received signal strength indication (RSSI), and
    when the phone is within the predetermined range, a first transmission provided from the phone via BLUETOOTH® is encrypted, the first transmission including the phone's ID, the ID being stored in a memory of a control unit of the vehicle,
    when a second transmission is provided from the phone via BLUETOOTH®, the second transmission is encrypted and includes the ID and a vehicle command, and
    when the second transmission is received, the ID is compared to the ID stored in the memory and if there is a match, the vehicle command is communicated to the control unit.

2. The system of claim 1, wherein the electronic system of the vehicle provides remote keyless entry or push button start functions.

3. The system of claim 2, wherein the push button start system is configured to recognize the phone as a key fob that is used to activate the push button start system.

4. The system of claim 3, wherein the phone includes a memory configured to store a software application enabling the phone to be recognized as the key fob.

5. The system of claim 1, wherein a door of the vehicle is unlocked by using the BLUETOOTH® receiver and transmitter when the phone is within the predetermined range.

6. The system of claim 1, wherein the phone further comprises a display configured to illustrate key fob related functions.

7. The system of claim 6, wherein the display is further configured to illustrate diagnostic information of the vehicle.

8. A method for providing vehicle access, comprising:
    receiving a request for vehicle access;
    providing vehicle access credentials to a mobile device associated with the request for access;
    accessing a vehicle by using the mobile device; and
    starting the vehicle by using the mobile device in place of the key,
    wherein the mobile device accesses the vehicle by using a BLUETOOTH® receiver plugged into a telematics port of the vehicle,
    wherein the mobile device accesses the vehicle when the mobile device is within a predetermined range from the vehicle,
    wherein the predetermined range is a distance from which the mobile device is permitted to lock or unlock a door of the vehicle and the predetermined range is calibrated using received signal strength indication (RSSI),
    when the mobile device is within the predetermined range, a vehicle command provided from the mobile device via BLUETOOTH® is encrypted, and
    wherein the vehicle access credentials permit access to the vehicle for a predetermined time, wherein the vehicle access credentials do not expire when the mobile device is outside the predetermined range.

9. The method of claim 8, further comprising downloading, at the mobile device, a software application that allows the vehicle access credentials to be provided to the mobile device.

10. The method of claim 8, wherein the mobile device starts the vehicle by using the BLUETOOTH® receiver.

11. The method of claim 8, further comprising providing, to the mobile device, a location of the vehicle associated with the vehicle access credentials.

12. The method of claim 8, wherein the mobile device is a smart phone.

13. The method of claim 8, wherein the mobile device is a BLUETOOTH® badge.

14. A system for a vehicle, comprising:
    a BLUETOOTH® receiver configured to be installed in a vehicle and connected with an electronic system of the vehicle, wherein the electronic system of the vehicle includes a BLUETOOTH® passive entry system; and a phone including a long-range radio frequency (RF) transceiver configured to transmit signals to and receive signals from the electronic system of the vehicle through a cellular network and a BLUETOOTH® transmitter configured to communicate with the BLUETOOTH® receiver in the vehicle within a predetermined range, wherein the predetermined range is a distance for dock lock and unlock in the BLUETOOTH® passive entry system and the predetermined range is calibrated using received signal strength indication (RSSI), and when the phone is within the predetermined range, a first transmission provided from the phone via BLUETOOTH® is encrypted, the first transmission including the phone's ID, the ID being stored in a memory of a control unit of the vehicle, when a second transmission is provided from the phone via BLUETOOTH®, the second transmission is encrypted and includes the ID and a vehicle command, and when the second transmission is received, the ID is compared to the ID stored in the memory and if there is a match, the vehicle command is communicated to the control unit.

* * * * *